Oct. 29, 1963   L. C. MATSCH ETAL   3,108,706
APPARATUS FOR IMPROVING VACUUM INSULATION
Filed Aug. 31, 1959
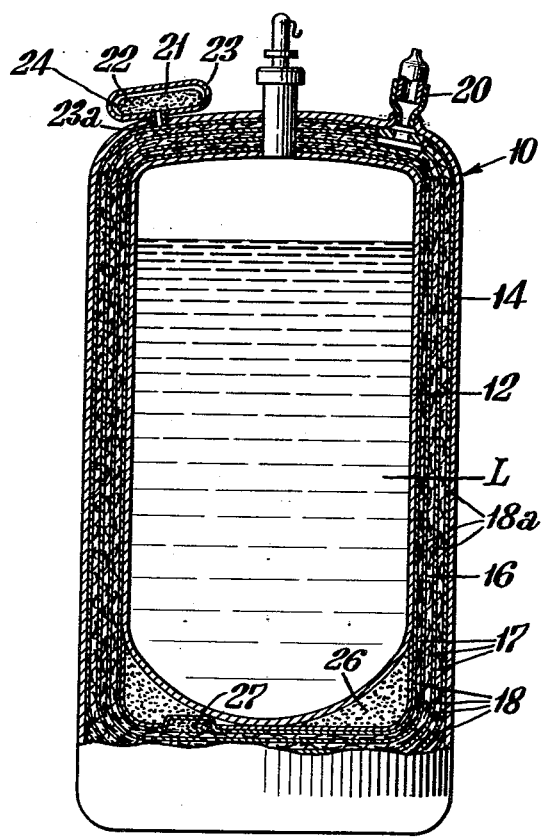
INVENTORS
LADISLAS C. MATSCH
DAVID I. J. WANG
JULE A. RABO
PAUL E. PICKERT
HARRY CHEUNG
BY *William F. Mesinger*
ATTORNEY

United States Patent Office 3,108,706
Patented Oct. 29, 1963

3,108,706
APPARATUS FOR IMPROVING VACUUM INSULATION
Ladislas C. Matsch, Kenmore, David I. J. Wang and Jule A. Rabo, Buffalo, Paul E. Pickert, Tonawanda, and Harry Cheung, Kenmore, N.Y., assignors to Union Carbide Corporation, a corporation of New York
Filed Aug. 31, 1959, Ser. No. 836,968
13 Claims. (Cl. 220—9)

This invention relates to a novel method of and apparatus for improving the efficiency of vacuum insulation for containers storing cold materials such as low boiling liquefied gases, as for example liquid oxygen, liquid nitrogen and the like.

Low boiling liquefied gas containers are usually constructed with double walls, the space between the inner vessel and the surrounding outer casing being maintained under a vacuum pressure to insulate the liquid in the inner vessel from the atmospheric heat. The vacuum space is frequently filled with a low conductive material to further reduce the rate of heat transfer.

While it is well known that many metals, including carbon steel, stainless steel and aluminum contain measurable amounts of dissolved hydrogen, such hydrogen has posed no problem in most prior insulation systems. It has been discovered, however, that when such metals are employed in containers designed to maintain super high quality thermal insulation efficiencies employing high vacuums on the order of 1 micron of mercury, slowly-evolved hydrogen accumulates in the evacuated space and increases the pressure above allowable limits. Hydrogen evolution from metals is especially objectionable in vacuum spaces employed for thermal insulation because the adsorbents that have been employed to remove and retain gases from such spaces are not sufficiently effective to control hydrogen. In a given insulation system, the absolute pressure must be maintained below some specified upper limit since the heat transmission due to gaseous conduction is proportional to the gas pressure at moderate absolute pressures up to the range where the mean free path of the gas molecules in the insulation space become so short as to approach the dimensions of the void spaces occupied by the molecules. Unless such a degree of evacuation is maintained, heat transmission across the insulation by gaseous conduction may be excessive. It is thus apparent that the accumulation of evolved hydrogen cannot be tolerated in high-quality thermal insulation systems.

The seriousness of this problem can be readily appreciated by considering the following actual tests which illustrate the consequences of hydrogen evolution. Several portable containers designed for storing and transporting a low-temperature liquefied gas were insulated with a solid-in-vacuum system having a total volume of approximately 4 cu. ft. The containers were provided with a quantity of crystalline zeolitic molecular sieve adsorbent having pores of about 5 Angstrom units in size, in accordance with the teachings of U.S. Patent No. 2,900,800 to P. E. Loveday. The insulation space was initially dried and evacuated to obtain a vacuum below 5 microns Hg with the adsorbent cold. The criterion of insulation performance was the ability of the containers to hold a sealed charge of liquid oxygen, initially saturated at about 65 p.s.i.g. for an extended period of time before the container pressure reached about 210 p.s.i.g., the set point of a relief device. With the high vacuum obtained on a freshly evacuated container, this holding time was about 80–90 hours.

After the insulation spaces had been sealed for several months, the performance of the vessels deteriorated considerably, and tests showed objectionably high absolute pressures in the vacuum spaces. Samples of gas withdrawn from the insulation spaces for analysis were found to consist largely of hydrogen. The results are summarized in Table I below:

| Vessel | Holding Time (hr.) | Vacuum with Cold Adsorbent (Microns, Hg) | Hydrogen Content in Vacuum Space (Percent) |
|---|---|---|---|
| A (freshly evacuated) | 90 | 0.9 | Negligible |
| B (after several months' service) | 27 | 26 | 78.3 |
| C (after several months' service) | 20 | 7 | 84.2 |

In the above tests, the normal evaporation rate with the containers of oxygen open to the atmosphere was also observed to increase greatly over the several months' time interval, consistent with the low holding time and high vacuum-space pressures which developed. Freshly evacuated vessels showed evaporation rates of about 1.60 cu. ft. of oxygen per hr., while vessel C, for example, had an evaporation rate of 2.66 cu. ft. per hr.

A comparison of the vacuum-space pressure and elapsed time characteristics of the aforementioned three containers also illustrates the present problem. When a container of low-temperature liquefied gas is sealed, the liquid in the container gradually warms due to heat leak; its pressure rises and this in turn warms the adsorbent. Coincidently, some of the adsorbed gas is released, thus increasing the pressure in the vacuum space. The quantities of oxygen, nitrogen and argon given off when the container warms are very small and usually not objectionable due to the high capacity of the adsorbent for these gases. The results of the vacuum pressure-elapsed holding time tests are summarized in Table II below:

| Vessel | Initial Vacuum (Microns, Hg) | Vacuum after 27 Hours (Microns, Hg) |
|---|---|---|
| A (freshly evacuated) | 1 | 1 |
| B (after several months' service) | 26 | 35 |
| C (after several months' service) | 37 | 50 |

"Initial Vacuum" refers to the vacuum with the contained liquid saturated at atmospheric pressure and "Vacuum after 27 Hours" refers to the vacuum pressure after the contained liquid had been sealed for the indicated duration. This table shows that a large volume of hydrogen is released after a sustained holding time, and it is apparent that the adsorbent alone cannot be relied upon for hydrogen control. Furthermore, the high absolute pressures observed after several months service, e.g. 25–35 microns Hg for vessels B and C, show that the cold capacity of the adsorbent for hydrogen is impractically low.

The data reported in Tables I and II was obtained with the containers at liquid oxygen temperature where the adsorbent's capacity for hydrogen is relatively low. If liquid hydrogen instead of liquid oxygen is to be stored in the containers, the capacity of adsorbents for hydrogen is considerably higher and a reasonable amount of adsorbent alone may be capable of producing a satisfactory low absolute pressure while the vessel is full. However, most containers for cryogenic liquids are emptied periodically, e.g., portable containers for liquid distribution, and the vessels tend to warm up during the empty periods due to heat leak. Such warming of empty cryogenic containers is undesirable because the 20° K.

r colder) refrigeration needed to recool the containers r refilling is very expensive. If only an adsorbent is esent, the warmup rate is accelerated because with ch increment of higher temperature, the vacuum deteriorates greatly due to evolved hydrogen, and the heat ık rate increases correspondingly. The capacity of adrbents for all gases is normally reduced to some extent warming. However in the case of hydrogen the adrbent is exceptionally sensitive to temperature change d for example will lose essentially all of its hydrogen pacity if warmed only to the temperature of liquid rogen.

One possible method of removing the hydrogen is to reacuate the insulation space continuosuly or at frequent ervals. However, such procedure often requires removing the container from service and breaking the seal the vacuum space. It also periodically introduces the ficult task of obtaining leak-tightness when resealing e space, and hence, it duplicates expensive test periods eeded to assure tightness. Furthermore, the procedure quires investment in many vacuum pumps for installaın, either on the containers themselves or at convenient ·evacuation stations. Obviously, such procedure would prohibitive in many systems, especially for small portle containers used in large numbers.

It is therefore an important object of the present invenın to provide a method of and apparatus for improving e efficiency of vacuum insulation in which hydrogen s is evolved from the materials in contact with the cuum space.

Another object of the invention is to provide an imoved vacuum insulating system for containers storing w-boiling liquefied gases.

Another object is to provide an improved system for moving the hydrogen evolved from materials in contact th a vacuum insulation space.

Still another object is to provide an improved comnation of materials for removing the hydrogen evolved om materials in contact with a vacuum insulation, as ll as removing air, moisture and other gases present, ıich elements cooperate to provide a high quality vacım insulating condition which neither material could complish alone.

Other objects, features and advantages of the present vention will be apparent to those skilled in the art from e following detailed description of a preferred embodient of the invention when considered in connection th the accompanying drawing in which:

The single FIGURE is a sectional view of a double ılled container embodying the principles of the invenın.

The present invention is predicated on the discovery at hydrogen evolved in vacuum spaces may be conolled by employing a selective hydrogen getter. By elective" is meant a getter which is unreactive with reect to substantially all vacuum-space gases other than drogen. If a non-selective getter such as barium is ed, it soon consumes its gettering capacity by reaction ith water, oxygen and nitrogen. As a result, there ould eventually be nothing left in the vacuum system pable of controlling the hydrogen. Among the selecre hydrogen getters which have been found satisfactory r use in the present invention are specially modified ıtural and synthetic zeolitic molecular sieves, heavy etal-loaded amorphous zeolites, palladium oxide and pper oxide. Also, normally non-selective getters may e specially treated to act selectively, as for example, ielding metallic barium with a thin sheet of palladium etal. Palladium foil acts as a selective diffusion barrier hich passes hydrogen but stops other common gases. he barium may be a finely divided powder, and its comırtment may be separated from the vacuum space by the ılladium shield.

The term "zeolite," in general, refers to a group of ıturally occurring and synthetic hydrated metal alumina silicates, some being amorphous and others crystalline in structure. In particular, heavy metal exchanged, synthetic zeolite X has been found satisfactory as the hydrogen selective getter of the present invention. The term "heavy metal" as used herein refers to a metal having a molecular weight above about 100, and in addition includes copper and nickel. More specifically, suitable heavy metals include copper, gold, iridium, lead, mercury, nickel, osmium, palladium, platinum, rhenium, rhodium, ruthenium, silver and tin. For purposes of simplicity the preparation and use of heavy metal exchanged zeolites as hydrogen selective getters will be described in terms of silver exchanged zeolite X but it is to be understood that the invention applies also to the other heavy metal exchanged zeolites. A suitable silver exchanged zeolite may be prepared by ion-exchanging sodium X zeolite with a silver salt to produce silver zeolite X which is subsequently activated (dehydrated) by partial evacuation at a temperature of 200–500° C. (preferably about 300° C.). Other heavy-metal exchanged zeolites may be prepared with the appropriate salt in an analogous manner. The starting material, sodium X zeolite, may for example be prepared by the method disclosed in U.S. Patent No. 2,882,244 issued April 14, 1959. Broadly, this method comprises mixing sodium hydroxide and sodium aluminate, and then adding the mixture to an aqueous solution of sodium silicate. After further mixing, crystallization of the zeolite is obtained preferably at about 100° C., whereupon the zeolite crystals are filtered off and dried.

The silver exchanged zeolite may be represented by the formula $Ag^+(X)$ and is capable of taking up hydrogen by replacing the silver cations in the zeolitic structure. The combination with hydrogen is conveniently expressed in the following manner, but it should be understood that this equation is not necessarily a concise mechanism; an effort has not been made to balance the equations chemically:

$$Ag^+(X) + H_2 \rightarrow [H^+(X) \cdot Ag^\circ] \qquad (1)$$

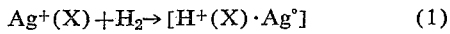

The above reaction takes place at ambient temperature and is exothermic to the extent that sufficient hydrogen will produce excessive temperatures in the zeolite. Hydrogen reaction temperatures at or slightly above ambient are considered ideal. Hydrogen reaction temperatures above 350° C. may destroy the zeolitic structure and may sinter or agglomerate the metallic silver produced in the reduction. However, overheating is not usually a problem when using the silver exchanged zeolite for gettering purposes in vacuum spaces because of the very small absolute quantities of hydrogen present.

If a quantity of the activated silver exchanged zeolite is exposed in a vacuum insulation space, any hydrogen evolved from surrounding materials will be consumed by the zeolite as described above. The hydrogen is held very strongly, and equilibrium pressures below about 1 micron Hg absolute are readily obtained. Pressures as low as 0.1 micron Hg have been observed.

The activated silver exchanged zeolite has a strong attraction for water, which subsequently can be removed rapidly from the molecular sieve only at elevated temperature (e.g., 200 to 500° C.) and under vacuum as described under the dehydration step above. Adsorbed water tends to inactivate the zeolite even at room temperature and seriously reduces its capacity for taking up hydrogen. For this reason, it is preferable to seal the dehydrated zeolite in an airtight vial prior to use to protect it from the atmosphere and thus conserve its capacity for hydrogen. The vacuum space should also be dried and at least partially evacuated before exposing the active zeolite in the space in order to conserve the gettering capacity of the material. A preferred handling method is disclosed in the previously referenced copending U.S. Serial No. 557,477, wherein the active material is sealed in a glass capsule and installed in a thin-walled extension of the vacuum space. After the vacuum space is dried and evacuated, the extension walls are deflected under a clamp until the vial is crushed.

In general, a suitable heavy metal must ion exchange onto a zeolite in simple or complex cationic form and in a valence state capable of being reduced by hydrogen to a lower valence state or to the free metal. It is believed that preferred metals will exhibit high electro negativity and will have relatively large atomic numbers. It is important to note that in taking up hydrogen the metal within the zeolite need not be reduced completely to the free metal state, but instead may simply be reduced from a higher to a lower valence state. Elements in a higher valency state are more easily reduced to a lower valency state than all the way to a free metal.

In addition to the reaction given in Equation No. 1 above, other reactions may also occur in vacuum spaces. Oxygen is usually present and will oxidize the elemental silver produced in Equation 1. The mechanism is probably and approximately as follows:

$$[H^+(X) \cdot Ag^\circ] + O_2 \rightarrow [H^+(X) \cdot Ag_2^+O] \qquad (2)$$

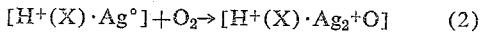

This reaction also proceeds readily at ambient temperature which leads to the belief that the metallic silver may be present in a non-crystalline, very finely dispersed form, perhaps even as discrete atoms. The silver compound resulting from Equation 2 may be reduced again with additional hydrogen from the vacuum space to reproduce the elemental form:

$$H^+(X) \cdot Ag_2^+O + H_2 \rightarrow [H^+(X) \cdot Ag^\circ] + H_2O \qquad (3)$$

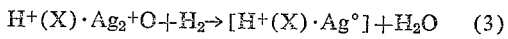

Again the reaction proceeds at ambient temperature. Thus, the elemental silver produced in the initial exchange with hydrogen is capable of repeated oxidation and reduction in a catalytic manner, resulting in chemical combination of hydrogen with oxygen present in the system. The water produced is strongly adsorbed in the pores of the zeolite and relatively large amounts may be "stored" before developing a vapor pressure detrimental to the vacuum system.

One form of the present invention contemplates the placement of two separate quantities of silver exchanged zeolite in the vacuum space: one quantity with the silver in the cationic state for hydrogen removal in accordance with Equation 1, and the other having the silver pre-reduced with hydrogen in the elemental state for oxygen removal as per Equation 2.

The effectiveness of silver exchanged zeolite X as a hydrogen getter in a vacuum space was illustrated in a test in which a 14.9 gm. sample of silver exchanged zeolite X was activated (dehydrated) in a glass container by warming 3 hours in a furnace to a final temperature of 350° C. During activation, the container was evacuated to a final pressure of less than 0.1 micron Hg absolute. In the activated state, the sample was bright yellow in color. After cooling the container, 3,400 micron-liters of pure hydrogen were admitted rapidly and produced a pressure of 840 microns. After one hour, the silver exchanged zeolite had reduced the pressure to 0.75 micron Hg. The container was then re-evacuated to about 0.1 micron Hg to remove any unreactive gases (e.g., nitrogen) which may have entered the system during admission of hydrogen. Since pure hydrogen had been introduced and since the system was at room temperature, the pressure reduction could not have been caused by adsorption phenomenon. Hence, the hydrogen was taken up by chemical reaction and was not reversibly pumped off during re-evacuation. Subsequently, additional hydrogen was admitted until a total of 192,330 micron-liters had been consumed by the getter. Within one-half hour following the addition of the gas, the absolute pressure had settled at 0.8 micron Hg, thereby illustrating the high hydrogen capacity of silver exchanged zeolite X.

Although metal-exchanged zeolite X and in particular the silver compound is preferred as a zeolitic hydrogen selective getter, other synthetic and naturally occurring zeolites are also useful in the present invention. For example, silver exchanged zeolites A and Y were dehydrated under vacuum and at elevated temperatures. Subsequently, under a hydrogen atmosphere there was no noticeable sorption of hydrogen at room temperature. Upon warming to 100° C., however, sorption of hydrogen proceeded rapidly as indicated by a marked rise in temperature. In another test, silver exchanged culliganite, a naturally occurring zeolite or amorphous alumina silicate of the permutit type exhibited good hydrogen gettering if warmed to 115° C. These tests suggest that metal exchanged zeolite X is somewhat unique and advantageous for room temperature sorption of hydrogen from vacuum spaces. Nevertheless, other zeolites may be successfully employed by warming the zeolite compartment of a vacuum space occasionally, e.g. once very 6 months. Zeolites which are reactive to hydrogen only at elevated temperature are particularly advantageous in vacuum insulation spaces exposed to relatively high temperatures at which they exhibit continuous activity.

The aforementioned silver exchanged zeolites A and Y may be prepared in a manner analogous to the preparation of silver exchanged zeolite X, using sodium zeolite A and Y as the respective starting materials. The preparation of sodium zeolite A is disclosed and claimed in U.S. Patent No. 2,882,243 to R. M. Milton, and the preparation of sodium zeolite Y is disclosed and claimed in U.S. Serial No. 109,487 filed May 12, 1961. In general, these compounds are prepared in a manner analogous to the preparation of sodium zeolite X.

As a feature of the invention, the hydrogen selective getter material may be used in combination with an absorbent material to achieve combined results which neither material could accomplish alone, thereby greatly improving the effectiveness of a vacuum insulating space. As previously discussed, the hydrogen selective getter materials of the present invention are capable of controlling traces of hydrogen which may appear unavoidably in vacuum spaces. The getters may also remove at least part of any oxygen which may be present. Other gases may also appear in the vaccum space either by desorption from the surfaces within the space or from minute leakage. Common gases are argon, nitrogen and water. Oxygen may also appear in quantities larger than the stoichiometric amount for reaction with hydrogen on the hydrogen selective getter as previously described. When the vacuum space is being employed to insulate a low-temperature vessel, these latter gases may be controlled effectively by means of an adsorbent bed located against the cold inner vessel. Suitable adsorbents include silica gel, charcoal and preferably a zeolitic molecular sieve, either natural or synthetic, such as disclosed in the aforementioned U.S. Patent No. 2,882,243. Excellent performance is obtained with natural or synthetic zeolites having pores at least about 5 angstroms in size disclosed in U. S. Patent No. 2,900,800. Preferred natural zeolites are fanjazite, chabazite and erionite while preferred synthetic zeolites are sodium X and calcium A.

A test was conducted to show that calcium zeolite A, which contains an appreciable amount of water, does not adversely affect the performance of silver exchanged zeolite X in removing hydrogen. A system containing 10 grams of calcium zeolite A at liquid nitrogen temperature and 1 gram of silver exchanged zeolite X at room temperature was evacuated, and 8,400 micron-liters of pure hydrogen was admitted. The pressure dropped rapidly to 0.8 micron Hg indicating that the hydrogen consumption rates were approximately equal to those observed with only the selective getter present in the system. In order to achieve maximum effectiveness with the combination of the two scavengers, it is preferred that the absorbent be highly activated (thoroughly dehydrated) bee installation. An activation temperature of 350° C. has been found satisfactory for calcium zeolite A. Adsorbents such as silica gel and charcoal are quite easily hydrated and may be preferred in some systems.

The combination of a cold absorbent and a relatively warm getter selective for hydrogen offers remarkable and unexpected advantages. The hydrogen selective getter is unreactive with respect to substantially all of the vacuum space gases other than hydrogen; if a non-selective getter were employed, its gettering capacity would soon be consumed by reaction with water, oxygen and nitrogen. In contrast, the present invention provides an absorbent which satisfactorily scavenges these gases, thereby allowing the employment of a selective getter whose capacity is reserved for hydrogen.

When a heavy metal-exchanged zeolite is employed as the hydrogen selective getter along with a cold absorbent, the adsorbent often performs a function in addition to controlling the oxygen, argon, nitrogen and water which may evolve or leak into the space. If water is produced in gettering hydrogen, the water may seriously reduce the getter's reaction rate or capacity for hydrogen. Furthermore, the continued production of water will eventually result in appreciable partial pressures of water over the selective getter. Since the adsorbent is cold, it has a much higher capacity for water than the warm silver exchanged zeolite. Thus, water produced on a silver exchanged zeolite by Reaction 3 above will be transferred to the cold absorbent where it is held more securely. This transfer of water will take place gradually under the driving force provided by the normal temperature difference between the two scavengers. As mentioned previously, the accumulation of water in the silver exchanged zeolite reduces its ability to take up hydrogen. Therefore, the performance of the silver-zeolite over an extended period of service is markedly improved by combination with a cold adsorbent.

The advantages of the hydrogen selective getter-cold sorbent combination were illustrated by a series of tests. In one such test, a total of 7,350 micron-liters of a gas mixture consisting of 70% hydrogen, 20% nitrogen, 5% oxygen, 2½% carbon monoxide, and 2½% methane was admitted to a system containing about 1 gram of silver exchanged zeolite X at room temperature and about 10 grams of calcium A zeolite at liquid nitrogen temperature. In a short time, the pressure had settled out at about 0.70 microns Hg. Again, the gettering rates were very high indicating that the presence of gases other than hydrogen does not impair the activity of the selective getter.

Another test was conducted which clearly shows the hydrogen selective nature of the silver exchanged zeolite X. A 1.0384-gram sample of silver exchanged zeolite X was installed in a vacuum system and was exposed to 650 microns Hg pressure of the same gas mixture used in the preceding test. In less than two hours, the pressure dropped to 160 microns Hg. Assuming that both oxygen (5%) and hydrogen (70%) were removed, the other 25% of the mixture theoretically should have produced a residual pressure of:

25% × 650 = 162.5 microns Hg

Thus, the 160 microns pressure observed in actual test agrees well with the residual pressure predicted by theory. After the pressure had settled at 160 microns Hg with only the silver exchanged zeolite exposed, an adsorbent trap containing 10 grams calcium zeolite A at liquid nitrogen temperature was exposed to the residual gas in the system. In approximately 80 minutes, a pressure of 0.5 micron was observed.

In still another test using the silver exchanged zeolite-cold calcium zeolite A combination with the former at room temperature, incremental additions of hydrogen to a vacuum system were made over an extended period of time and eventually resulted in a minimum obtainable absolute pressure of 2 microns Hg. It was suspected that the presence of water in the silver exchanged zeolite X had reduced its hydrogen capacity. Without otherwise disturbing the system, the silver exchanged zeolite X compartment was warmed momentarily to about 100° C. with external heat. The vacuum pressure began dropping immediately and eventually reached 0.04 micron Hg. It was concluded that the introduction of heat accelerated the transfer of water from the silver exchanged zeolite to the cold adsorbent, and thus restored much of the hydrogen capacity of the selective getter.

In the event that the cold outer wall of the inner vessel periodically warms up in service, the cold adsorbent may release considerable water which will tend to diffuse through the vacuum space toward the silver exchanged zeolite. In order to protect the silver exchanged zeolite from such water during warmup periods, a material capable of taking up water such as zeolitic molecular sieves having a pore side of 4 or 5 angstrom units as disclosed in U.S. Patent No. 2,882,243 may be employed. Other adsorbents such as $P_2O_5$ would also be useful. The desiccant material may for example be interposed in a channel connecting the vacuum space with the silver exchanged zeolite. The adsorbent will permit hydrogen to pass freely, but will trap most of the unwanted water. When the cold inner vessel wall is rechilled, the water will gradually return to the cold adsorbent.

A conservative figure for the hydrogen capacity of silver exchanged zeolite X is at least 6,000 micro-liters per gram of getter, and it has been found that the rate of hydrogen evolution in a typical vacuum space is about 2,500 micron-liters per year per cubic foot of vacuum space. Thus, the quantity of getter needed for a given service may be computed as follows: Assume a 4 cu. ft. vacuum space which must be protected from hydrogen accumulation for a period of 10 years. The quantity of silver exchanged zeolite X needed is (2,500×4×10)/6,000=17 grams. For additional protection, it is preferred to install more getter than the calculated amount, thereby providing for the possibility that unforeseen changes in hydrogen capacity and/or consumption rate may occur with the passage of time.

Certain oxides of metals which are reduced by hydrogen at reasonably low temperatures have also been found suitable for employment as the hydrogen selective getter of the present invention, as for example copper oxide and palladium oxide. The latter reacts readily with hydrogen at room temperature and reduces to the metal:

$$PdO + H_2 \rightarrow Pd + H_2O \tag{4}$$

As in the case of silver exchanged zeolite, an adsorbent such as calcium zeolite A is preferably provided against a cold wall in the vacuum insulation space when a metal oxide getter is employed. An adsorbent employed with a hydrogen selective getter such as silver exchanged zeolite acts to control all gases other than hydrogen. In the case of silver exchanged zeolite, some oxygen may also be removed in secondary reactions in which water is produced, and the adsorbent then serves to control the water. For palladium oxide, water is produced in the primary Reaction 4 above, and may also be produced in secondary reactions, and the adsorbent serves to control the resultant water.

The suitability of palladium oxide as the hydrogen selective getter of the present invention was illustrated in a series of tests on a simulated vacuum insulation space. The apparatus included a constant volume system containing palladium oxide powder at room temperature and a chamber holding a predetermined amount of calcium zeolite A adsorbent at liquid nitrogen temperature. The quantity of adsorbent used for each test run was based on the quantity of gases other than hydrogen which were to be adsorbed. The gases were admitted to the systems, their initial pressure recorded, and after exposure to the palladium oxide, their final pressures recorded. As soon as the gas pressure was reduced below a value of 1 micron of Hg, a new transfer of gas was admitted to the system. Therefore, the final pressure recorded was not the lowest pressure attainable. To determine the effect of the other gases such as oxygen, nitrogen, carbon monoxide, carbon dioxide and methane, the chamber holding the adsorbent was periodically warmed up to room temperature thereby releasing these adsorbed gases and permitting them to come into contact with the palladium oxide and then recooled to liquid nitrogen temperature. This thermal cycling had no effect on the capacity of the material for hydrogen.

In the first test, the palladium oxide sample weighed 1.0155 grams, and the system volume was 3 liters. Hydrogen gas was introduced to the system, and the recorded pressure of the last transfer before saturation was 0.78 micron at 114,600 micron-liters per gram of getter.

In the second test, the palladium oxide sample weighed 0.5071 gram, and the system volume was 4 liters. A gas mixture comprising 70% $H_2$, 20% $N_2$, 5% $O_2$, 2.5% CO and 2.5% $CH_4$ was introduced to the system, and the recorded pressure of the last transfer before saturation was 0.4 micron at 132,000 micron-liters per gram of getter.

It was concluded from these and other tests that the capacity of palladium oxide for hydrogen is about 110,000 micron-liters per gram. This capacity is on the order of 10-fold greater than silver exchanged zeolite X. Rate of reaction is high and is far greater than the rates of hydrogen evolution which have been observed. Assuming that the hydrogen evolution rate is about 2,500 micron-liters per year per cu. ft. of vacuum space, the quantity of palladium oxide needed to protect a 4 cu. ft. space for 10 years is $(2,500\times 4\times 10)/110,000=0.91$ gram.

The palladium oxide used in the aforedescribed tests is commercially available and needs no pretreatment or activation. In can be handled without damage in normal atmospheres free of hydrogen, and this represents a decided advantage over such non-selective getters as barium which must be prepared in a carefully controlled inert atmosphere. Nevertheless, palladium oxide is preferably installed in vacuum insulation spaces in sealed glass capsules of the type described for use with the molecular sieve hydrogen selective getters. This is because the usual bake-out procedure for evacuating cryogenic containers results momentarily in the rapid evolution of relatively large volumes of hydrogen, and much of the capacity of an exposed getter would be needlessly consumed consumed at this stage.

Metallic palladium produced in Reaction 4 will react at room temperature with oxygen present to reform the oxide as follows:

$$2Pd+O_2\rightarrow 2PdO \quad (5)$$

The reformed oxide is then capable of reaction with additional volumes of hydrogen as per Reaction 4. Evidence that these reactions actually occur was provided in still another test with the 4-liter vacuum system in which a 0.5071-gram sample of palladium oxide and a 50-gram sample of calcium zeolite A were exposed. A total of 95,640 micron-liters of the previously described gas mixture was admitted, and a final pressure of 0.62 micron Hg was observed. The absorbent was then permitted to warm up to room temperature whereupon the pressure increased to 5,600 microns mercury, thereby accounting for over 23% of the total gas admitted. This desorbed gas was pumped off the system and analyzed by a mass spectrometer. Assuming that the hydrogen and oxygen were taken up in accordance with the Reactions 4 and 5, the residual gas should have been predominantly nitrogen, carbon monoxide, and methane. The following analysis (dry basis) of the desorbed gas shows that this was actually the case:

|  | Percent |
|---|---|
| CO+$N_2$ | 77.9 |
| $CH_4$ | 21.6 |
| $O_2$ | 0.45 |
| A | 0.03 |
| $CO_2$ | 0.02 |
| $H_2$ | 0.00 |
| Total | 100.00 |

The above test is a strong indication that Recation 5 is reasonably complete with respect to oxygen. If oxygen had not been taken up chemcally, it would have amounted to about 17% of the desorbed gas rather than 0.45%.

Illustrated in the single figure in the drawing is a liquefied gas holding vessel or double walled container 10 embodying the principles of the present invention. The double walled liquid container comprises an inner vessel or cold wall 12 of impervious metal which is not embrittled at low temperatures, such as stainless steel, for holding cold material such as liquefied gas L, such as oxygen, nitrogen, argon, helium or hydrogen. The inner vessel 12 is generally cylindrically shaped and is surrounded by a cylindrical gas-tight shell or jacket or warm wall 14 of suitable metallic material, completely encompassing the inner vessel 12 and providing an intervening evacuable insulating space 16 to provide substantial resistance to heat leakage therethrough.

The intervening space 16 may be a straight vacuum insulated space provided with polished metal material surfaces or preferably provided with a low conductive thermal insulation, for example, an opacified powder insulating material such as disclosed in U.S. Patent No. 2,967,152 to L. C. Matsch et al., or a composite insulation such as disclosed in U.S. Patent No. 3,007,596 to L. C. Matsch. The latter insulation consists of a low heat conductive material and a multiplicity of spaced radiation-impervious barriers. The low heat conductive material is preferably a fiber material which may be produced in sheet form. Examples of the latter include a filamentary glass material such as glass wool and fiber glass, preferably having fiber diameters of less than about 50 microns. Also such fibrous materials preferably have a fiber orientation substantially perpendicular to the direction of heat flow across the insulation space. The spaced radiation-impervious barriers may comprise either a metal, metal oxide or metal coated material, such as aluminum coated plastic film or other radiation reflective or radiation adsorptive material or a suitable combination thereof. Radiation reflective materials comprising thin metal foils are particularly suitable, for example, reflective sheets of aluminum foil having a thickness between about 0.2 millimeter and 0.002 millimeter. Other radiation reflective materials which are susceptible of use in the practice of the invention are tin, silver, gold, copper, cadmium or other metals. When fiber sheets are used as the low-conductive material, they may additionally serve as a support means for relatively fragile radiation impervious sheets.

As illustrated in the figure, insulation space 16 is filled with low-conductive layers 17 preferably formed of fiber glass having fiber diameters of less than about 50 microns and radiation impervious layers 18 preferably formed of aluminum foil sheets having a thickness between about 0.2 millimeter and 0.002 millimeter. The alternate layers may be spirally wrapped around the inner vessel 12 with one end of the insulation wrapping in contact with the inner vessel and the other end nearest the outer casing 14. Alternately, the layers may be mounted concentrically with respect to the inner vessel 12. In either embodiment, the fibers of layer 17 are preferably oriented substantially parallel to radiation impervious layers 18 and substantially perpendicular to the direction of heat flow across the insulation space 16. Radiation impervious layers 18 preferably provided with small holes or perforations for migration of gas molecules therethrough, so as permit more efficient evacuation of the insulation space. rthermore, such perforations permit easier passage of s molecules to the hydrogen selective getter and adsornt compartments for removal thereof.

Use of the hydrogen selective getter in combination th the aforedescribed wrapped insulation provides unpected advantages, because the fiber materials used in is type of insulation contain voids which on the average are larger in dimension than in powder-type insulans. This means that the wrapped-type insulation is ore pressure sensitive, since it loses its high insulating ality more rapidly on pressure increase in the vacuum ace, than does powder-type insulation. The presence the hydrogen selective getter minimizes this pressure crease and thus permits continuation of a highly efient insulating system for long periods.

Exhaustion of the space between the container walls accomplished by providing outer shell 14 with a nipe having a ductile metal evacuation tube 20. The presre within the insulating space should be reduced to a lue such that at service conditions the pressure is bew 10 microns Hg, preferably below 5 microns Hg, and r best results below 1 micron Hg. After exhaustion, e tube 20 is suitably crimped and soldered or welded effectively seal the vacuum space 16.

A sealed capsule 21 made of glass or other frangible aterial, and containing a suitable amount of active setive getter material 22 preferably in a vacuum or in atmosphere inert to the getter, e.g. argon, is suitably sposed in a getter chamber or protuberance 23 which mmunicates with the vacuum space 16 through chan-l 23a. The latter may contain a water-selective adrbent or desiccant such as silica gel, for removing moisre as previously described. At the desired time, prefably after the space 16 has been exhausted by a vacuum mp or other suitable apparatus and the evacuation be 20 crimpingly sealed, the selective getter chamber is suitably deformed as with a pair of pliers or a rew clamp, thereby crushing the glass capsule 21 and posing the hydrogen selective, active getter material to the insulation space 16. The capsule 21 prefer-ly should be attached to the warm wall 14 of the outer ell since the rate of gettering decreases with a reducn in temperature. The getter capsule 21 may be ened either before or after the inner vessel 12 is filled th cold liquid, the former being preferred.

Preferably the hydrogen selective getter is used in finely wdered pure form, because the getter is readily pre-red in this form and exhibits a large surface area per it weight. These features permit utilization of subntially all of the hydrogen capacity of the selective tter introduced in the vacuum space, and provide a fficiently high rate of gettering action throughout the e of the getter. If the selective getter is introduced in latively large, fused particles, only the outer portion of e getter will react at a sufficiently high rate for optimum ility in maintaining a high vacuum.

As an alternate to the powder form, a thin film of etal-containing getter may be applied on a supporting se such as an inert foil. For example, a getter-coated plated foil may be wound in a loose coil and sealed the frangible capsule. As a further alternative, the lective getter may be vapor deposited on an inert auxary powder such as finely divided silica. It is to be ted, however, that the metal exchanged zeolitic molecur sieve getters are probably more readily employed in e powderous form than in these surface applied forms.

An adsorbent container or blister 26 is preferably loted against the cold outer wall of inner vessel 12, in ntrast to the hydrogen selective getter 22 which is eferably associated with the warm wall of outer casing . In such locations, the gas removal rates and caicities will be maximum for both adsorbent and hydrogen selective getter. A filter or screen 27 provided in the adsorbent blister insures the retention of the adsorbent adjacent the cold wall, and prevents migration of insulating materials into the blister.

It will be understood that modifications and variations may be effected without departing from the spirit and scope of the invention. For example, although the invention has been specifically described and illustrated in terms of providing and insulating system for a double walled cylindrical container for storing liquefied gases, it is admirably suited for use in a flat panel under a vacuum pressure for insulating a box containing low temperature materials such as deep frozen solid materials.

What is claimed is:

1. In a double-walled vacuum insulated space, the combination therewith of a hydrogen selective getter being non-reactive to other vacuum space gases, exposed to said space and comprising copper oxide.

2. In a double-walled vacuum insulated space, the combination therewith of a hydrogen selective getter being non-reactive to other vacuum space gases, exposed to said space and comprising palladium oxide.

3. In a double-walled vacuum insulated space, the combination therewith of a hydrogen selective getter being non-reactive to other vacuum space gases and comprising palladium oxide; and an adsorbent, said hydrogen selective getter and said adsorbent being exposed to said space.

4. In a double-walled vacuum insulated space having an absolute pressure below about 10 microns mercury, the combination therewith of a hydrogen selective getter selected from the group consisting of palladium oxide and copper oxide and an adsorbent selected from the group consisting of calcium zeolite A, silica gel and charcoal, said hydrogen selective getter and said adsorbent being exposed to said space.

5. In a double-walled vacuum insulated space, the combination therewith of an insulation comprising a low heat conductive material and a multiplicity of spaced radiation impervious barriers and palladium oxide as a hydrogen selective getter being non-reactive to other vacuum space gases and exposed to said space.

6. In a double-walled vacuum insulated space, the combination therewith of an insulation comprising a low heat conductive fibrous material and a multiplicity of radiation-impervious sheet barriers supportably carried by said fibrous material, and palladium oxide as a hydrogen selective getter being non-reactive to other vacuum space gases and exposed to said space.

7. In a double-walled vacuum insulated space having an absolute pressure below about 10 microns mercury, the combination of an insulation comprising a low heat conductive fibrous material and a multiplicity of radiation-impervious aluminum foils supportably carried by said fibrous material and being disposed in parallel spaced relation to each other, said fibrous material having a fiber orientation substantially parallel to the foils and substantially perpendicular to the direction of heat flow across said space; and palladium oxide as a hydrogen selective getter being non-reactive to other vacuum space gases and exposed to said space.

8. In a double-walled vacuum insulated space, the combination of an insulation comprising a low heat conductive fibrous material and a multiplicity of radiation-impervious sheet barriers supportably carried by said fibrous material; a hydrogen selective getter being non-reactive to other vacuum space gases and selected from the group consisting of palladium oxide, and copper oxide; and an adsorbent, said hydrogen selective getter and said adsorbent being exposed to said space.

9. A container for storing liquefied gas having a boiling point below about 233° K. including an inner vessel for storing a liquefied gas body, an outer casing enclosing and separating said inner vessel from the atmosphere, an insulating space under a vacuum pressure between said inner vessel and said outer casing, a sealed hydrogen selective getter-containing capsule adjoining the inner wall of said outer casing, said hydrogen selective getter being non-reactive to other vacuum space gases and comprising palladium oxide.

10. A container according to claim 9 for storing liquefied gas, in which an adsorbent-containing blister is provided adjoining the outer wall of said inner vessel, and in communication with said insulating space.

11. A container according to claim 9 for storing liquefied gas, in which said insulating space contains an insulation comprising a low heat conductive fibrous material and a multiplicity of radiation-impervious sheet barriers supportably carried by said fibrous material.

12. A container according to claim 9 for storing liquefied gas, in which said insulating space contains an insulation comprising a low heat conductive fibrous material and a multiplicity of radiation-impervious aluminum foils supportably carried by said fibrous material and being disposed in parallel spaced relation to each other, said fibrous material having a fiber orientation substantially parallel to the foils and substantially perpendicular to the direction of heat flow across said space.

13. A container according to claim 9 for storing liquefied gas, in which a channel connects the hydrogen selective-getter containing capsule and the vacuum insulating space, and a desiccant material is provided in said channel.

References Cited in the file of this patent

UNITED STATES PATENTS

| | | |
|---|---|---|
| 1,250,815 | Dorsey et al. | Dec. 18, 1917 |
| 2,121,180 | Vatter | June 21, 1938 |
| 2,329,765 | Jackson et al. | Sept. 21, 1943 |
| 2,453,968 | Buttner et al. | Nov. 16, 1948 |
| 2,509,702 | Stanier | May 30, 1950 |
| 2,547,607 | Sulfrian | Apr. 3, 1951 |
| 2,582,885 | Rosenblatt | Jan. 15, 1952 |
| 2,650,478 | Brown | Sept. 1, 1953 |
| 2,678,885 | Porter | May 18, 1954 |
| 2,749,462 | Kenty et al. | June 5, 1956 |
| 2,793,314 | White | May 21, 1957 |
| 2,826,480 | Webster | Mar. 11, 1958 |
| 2,843,777 | Szegho | July 15, 1958 |
| 2,863,526 | Salmon | Dec. 9, 1958 |
| 2,871,669 | Mann et al. | Feb. 3, 1959 |
| 2,882,244 | Milton | Apr. 14, 1959 |
| 2,890,367 | Hirschhorn et al. | June 7, 1959 |
| 2,900,800 | Loveday | Aug. 25, 1959 |
| 2,960,475 | Baronetzky | Nov. 15, 1960 |
| 2,965,218 | Jayne | Dec. 20, 1960 |
| 3,007,596 | Matsch | Nov. 7, 1961 |